(12) United States Patent
Verma et al.

(10) Patent No.: US 11,354,113 B1
(45) Date of Patent: Jun. 7, 2022

(54) RELIABLE DEPLOYMENT OF UPGRADE EVENTS FOR A SERVICE BASED ON PREDEFINED ROLLOUT POLICIES

(71) Applicant: MICROSOFT TECHNOLOGY LICENSING, LLC, Redmond, WA (US)

(72) Inventors: Nidhi Verma, Redmond, WA (US); Ankur Jauhari, Bothell, WA (US); Min Shao, Bellevue, WA (US); Sudharsan Ganesan, Redmond, WA (US); Shobana Krishnamoorthy, Redmond, WA (US); Rahul Nigam, Bothell, WA (US); Roberta Cannerozzi, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/149,637

(22) Filed: Jan. 14, 2021

(51) Int. Cl.
*G06F 8/65* (2018.01)
*H04L 43/04* (2022.01)

(52) U.S. Cl.
CPC .............. *G06F 8/65* (2013.01); *H04L 43/04* (2013.01)

(58) Field of Classification Search
None
See application file for complete search history.

(56) References Cited

U.S. PATENT DOCUMENTS 10,389,602 B2   8/2019   Chang et al.
2014/0081616 A1*  3/2014   Poulin ................. G06F 11/3668
                                                                   703/22
(Continued)

FOREIGN PATENT DOCUMENTS

WO     2007136863 A2    11/2007

OTHER PUBLICATIONS

"Help secure software supply chains on Google Kubernetes Engine", Retrieved from: https://web.archive.org/veb/20201005150125/https:/cloud.google.com/solutions/secure-software-supply-chains-on-google-kubernetes-engine, Oct. 5, 2020, 10 Pages.
(Continued)

*Primary Examiner* — Marina Lee
(74) *Attorney, Agent, or Firm* — Jacob P. Rohwer; Newport IP, LLC

(57) ABSTRACT

The techniques disclosed herein enable systems to deploy upgrade events in a controlled manner to different resource units that provide a service utilizing predefined rollout policies. To deploy an upgrade event, a system determines a risk factor for the upgrade event and presents predefined rollout policies to a feature group for selection based on the risk factor. Upon selection of a rollout policy, the system can deploy the upgrade event according to parameters defined by the selected rollout policy. The system is further configured to analyze telemetry data received from the resource units to determine an updated risk factor and determine whether the updated risk factor crosses a risk factor threshold. If the updated risk factor crosses the threshold, the system can identify another rollout policy to replace the selected policy.

(Continued)

In addition, the system can receive an override workflow request to expedite upgrade event deployment.

19 Claims, 12 Drawing Sheets

(56) References Cited

U.S. PATENT DOCUMENTS

2017/0286080 A1* 10/2017 Krishnamoorthy ....... G06F 8/65
2020/0287793 A1* 9/2020 Buck ..................... G06F 21/577

OTHER PUBLICATIONS

Li, et al., "Gandalf: An Intelligent, End-To-End Analytics Service for Safe Deployment in Cloud-Scale Infrastructure", In Proceedings of Symposium on Networked Systems Design and Implementation, 2020, 14 Pages.

Mixdorf, Diebold, "Blog: Containerization: The perfect mechanism for the deployment and orchestration of microservices", Retrieved from: https://www.dieboldnixdorf.com/en-us/retail/insights/blog-retail/containerization-the-perfect-mechanism-for-the-deployment-and-orcheslialion-of-microservices, Dec. 27, 2018, 8 Pages.

Pierantoni, et al., "Describing and Processing Topology and Quality of Service Parameters of Applications in the Cloud", In Journal of Grid Computing, Jun. 15, 2020, 18 Pages.

Russinovich, Mark, "Advancing safe deployment practices", Retrieved from: https://azure.microsoft.com/en-in/blog/advancing-safe-deployment-practices/, Feb. 5, 2020, 9 Pages.

Sharwood, V, "Tale of Fail: Microsoft offers blow-by-blow Azure outage account", Retrieved from: https://www.theregister.com/2014/12/18/microsoft_tells_blowbyblow_azure_fail_tale/, Dec. 18, 2014, 7 Pages.

Zhang, et al., "Towards QoS-Aware and Resource-Efficient GPU Microservices Based on Spatial Multitasking GPUs in Datacenters", In Journal of arXiv:2005.02088v1, May 5, 2020, 13 Pages.

* cited by examiner

US 11,354,113 B1

RELIABLE DEPLOYMENT OF UPGRADE EVENTS FOR A SERVICE BASED ON PREDEFINED ROLLOUT POLICIES

BACKGROUND

As cloud computing gains popularity, more and more data and/or services are stored and/or provided online via network connections. Providing an optimal and reliable user experience is an important aspect for cloud-based platforms that offer network services. In many scenarios, a cloud-based platform may provide a service to thousands or millions of users (e.g., customers, clients, tenants, etc.) geographically dispersed around a country, or even the world. In order to provide this service, a cloud-based platform often includes different resources, such as server farms, hosted in various datacenters. In addition, the service can be constructed of various software components (which may also be referred to as features or functions).

To continue improving the user experience and/or provide an optimal and reliable user experience, an entity providing the cloud-based service may deploy features and/or upgrades to different resources. The upgrades may include updated code and/or other mechanisms configured to maintain, correct, add, and/or remove functionality associated with the service provided. Upgrades are deployed by way of specialized mechanisms which may be referred to herein as deployment vehicles.

Unfortunately, in traditional solutions, various deployment vehicles that provide an upgrade to a service do not follow uniform or standardized rollout policies (e.g., rollout itineraries). Stated another way, traditional solutions do not provide a well-defined way of controlling how an upgrade is deployed to different resources that compose a network service. For example, the entity deploying the upgrade may not know where an upgrade has been deployed. In some situations, the rollout itinerary of a certain deployment vehicle may be poorly defined or even entirely undocumented (e.g., not enforced in code). For instance, some deployment vehicles can rollout an upgrade to resources, geographically dispersed throughout the world, in an unsupervised and/or undetected manner (e.g., deploy the upgrade to 100% of the target resources all at the same time).

Deploying upgrades for a service in such an inconsistent manner often leads to high severity regression incidents, or problems, that can result in a degraded user experience and/or a loss of functionality within the service (e.g., a feature being temporarily unavailable). While unregulated rollout policies afford individual deployment vehicles greater autonomy, such solutions exacerbate the difficulty addressing problems during deployment which ultimately can have a greater negative effect on the service as a whole due to the lack of well-defined steps. For example, in the deployment vehicle discussed above, effectively addressing a problem discovered after deploying to resources around the world would likely require extensive engineering effort, significant service downtime, and severe disruption to critical applications and/or features.

It is with respect to these and other considerations that the disclosure made herein is presented.

SUMMARY

The disclosed techniques improve the efficiency and functionality of cloud-based services by providing a set of predefined rollout policies to enable consistent and stable deployment of upgrades. Generally described, a system utilizes a predefined set of rollout policies to deploy upgrades to various resources in a well-defined and controlled manner. The resources are useable to implement a service and can include physical and/or virtual resources (e.g., processing, storage, and/or networking resources) that are divided into different resources units.

In various examples, the resource units may be different server farms configured within the same and/or different datacenters. In another example, the resources units may be different networks configured for the same and/or different geographic locations (e.g., datacenters). An individual upgrade that is deployed to these different resource units is referred to herein as an upgrade event. As described above, an upgrade event may include updated code and/or other mechanisms configured to maintain, correct, add, and/or remove functionality associated with the service provided. The service can include cloud-based applications that provide access to internal sites, documents, lists, libraries and the like from diverse user devices. In addition, the service can be constructed of various components, or features. To expand, maintain, and/or improve a service, new upgrade events (e.g., features) can be deployed using deployment vehicles.

As discussed above, existing solutions deploy upgrade events without a predefined set of rollout policies. Typically, due to the diversity of upgrade events, each deployment vehicle operates according to its own rollout policy to allow increased autonomy for individual deployment vehicles. However, the lack of well-documented rollout itineraries can result in severe regression incidents requiring significant engineering support and downtime resulting in a degraded user experience. Thus, there is a need for cloud-based service providers to deploy upgrades in a well-defined and controlled manner to ensure stability and a reliable user experience.

In various examples, a standardized set of rollout policies enables deployment of upgrade events in a sequence (e.g., phases). Each phase can be associated with a wait time before proceeding to a subsequent deployment phase. By providing well-defined deployment phases and wait times, the system can deploy the upgrade event in a controlled manner to prevent severe problems and maintain a consistent user experience. Further, the system can monitor the performance of the upgrade event as it is rolled out to identify any problems. Consequently, the impact of any problems that arise and the effort required to resolve those problems can be minimized.

In contrast to existing solutions, the use of predefined rollout policies as disclosed herein enables automated control of upgrade event deployments. Previously, many upgrade event deployments can largely be a manual process relying upon a "push" by an engineer or technician, and as such, the upgrade event deployment is subject to human error and can be hampered with respect to potential deployment scale. By automating the control of upgrade event deployments, the system can eliminate human error from the process and also enable large scale upgrade event deployment.

To deploy an upgrade event, the system can determine a risk factor for the upgrade event based on properties of the upgrade event such as a payload type and a deployment scope. The system can then provide a set of predefined rollout policies to a feature group based on the risk factor and receive a selection of a rollout policy from the feature group. In some configurations, the system can recommend a rollout policy based on a comparison of the risk factor to a risk factor threshold. Alternatively, the feature group can set the risk factor and subsequently provide the risk factor to the system. A feature group can be any entity that is responsible for the upgrade event in question, such as a single engineer or a group of developers.

In addition, a rollout policy can define various parameters for controlling the deployment of upgrade events. For instance, a rollout policy can define a number of phases with which to deploy an upgrade event and/or the size of each phase. In a specific example, a rollout policy can define that an upgrade event be deployed to resource units in six phases, with each respective phase comprising 1% of the total resource units to be upgraded, 10% of the total resource units to be upgraded, 25% of the total resource units to be upgraded, 50% of the total resource units to be upgraded, 75% of the total resource units to be upgraded, and 100% of the total resource units to be upgraded.

The rollout policy can also specify a wait time for each phase (e.g., may be referred to as a bake time). The wait time is a period of time after the upgrade event is deployed to a set of resource units in a deployment phase, to allow for usage of the deployed upgrade event and collection of telemetry data. In various examples, the grouping of resource units within a phase can be such that higher priority resources are arranged in later phases of the deployment process to protect the higher priority resources from experiencing degraded performance and/or a sub-optimal user experience. For example, the initial phase(s) can include internal server farms configured to serve the feature group to enable containment and rapid resolution of any problems that arise. Furthermore, the resource units of later phases may belong to high priority entities (e.g., customers, tenants, etc.). High priority entities can include those that handle sensitive information such as a financial institution or those that operate security critical systems such as an airline. By initially deploying to internal or lower priority resource units, any issues that affect the performance and user experience can be resolved before the upgrade event is deployed to higher priority resource units.

The system is also configured to receive telemetry (e.g., performance) data from the resources. Telemetry data, for instance, can define the progress of an upgrade event at a certain resource. Telemetry data can also define usage information of an upgrade event at a resource, e.g., any new errors occurring in a software service because of the upgrade event deployment. The telemetry data can include reliability signals describing performance of the upgrade event. Telemetry data can also include user feedback to report errors. Based on the telemetry data, the system can determine an updated risk factor. If the updated risk factor exceeds or falls below a risk factor threshold indicating a change in risk from the initial deployment, the system can then select a new rollout policy with which to continue deploying the upgrade event. For example, the new rollout policy can speed up the deployment if the updated risk factor is lower than the initial risk factor. In another example, the new rollout policy can slow down the deployment if the updated risk factor is higher than the initial risk factor.

As discussed above, the system presents a feature group with a set of predefined rollout policies from which to choose for deployment of an upgrade event. Accordingly, in some examples, the deployment may be limited to one of the predefined rollout policies. However, there may be some emergency situations that require rapid and complete deployment of an upgrade event to address critical issues that suddenly arise within the service. In various examples, the system can receive an input requesting an "override workflow" rollout policy. The override workflow rollout policy can be a specialized rollout policy that bypasses the wait times and/or telemetry data analysis of the other rollout policies to expedite upgrade event deployment. Consider a scenario wherein a critical security flaw is discovered in a cloud-based service, placing important data such as personal user information at risk. In this scenario, the override workflow can be utilized to rapidly deploy an upgrade event addressing the security flaw. Based on the received request, the system can approve an override workflow rollout policy to deploy an upgrade event faster than predefined set of rollout policies.

In some examples, the override workflow rollout policy can also include an "express" variant to allow flexibility in addressing various high priority situations or critical incidents while implementing one of the predefined rollout policies. In an express override workflow example, the override workflow rollout policy can include a capability to evaluate a rollout policy in light of an active incident, such as one that negatively impacts operations of a service or user experience. Accordingly, the override workflow rollout policy can modify or bypass aspects of the rollout policy to agilely address various situations.

As described above and further discussed herein, by employing a predefined set of rollout policies to deploy upgrade events, the disclosed system can more efficiently and effectively deploy upgrade events to different resource units that compose at least part of a service. This is enabled by the deployment phases and wait times specified by the various rollout policies. The deployment phases and wait times provide a clear picture of the progress of an upgrade event deployment and well-defined positions for a feature group to fall back on should problems arise during deployment. Predefined rollout policies can also improve the performance of various resource units. By deploying upgrade events in well-defined phases with clear wait times, the impact on end users of the service is minimized. In existing solutions with no predefined rollout policies, the upgrade event may arrive unexpectedly resulting in sudden downtime and a degraded user experience. In contrast, by employing the disclosed techniques, users of the resource can be informed ahead of time that an upgrade event is incoming, allowing the users to plan accordingly.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
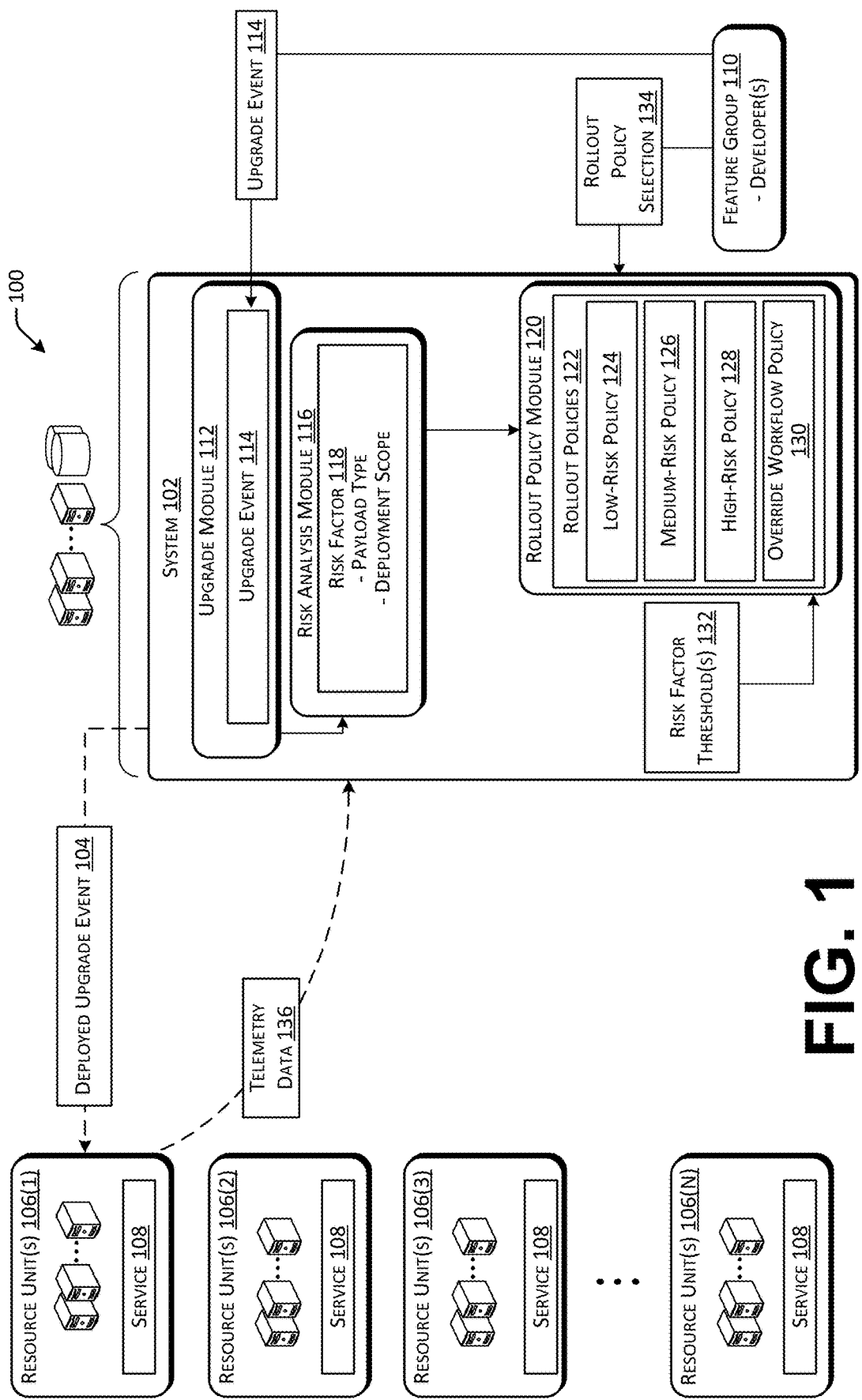
FIG. 1 illustrates an environment in which a system can deploy upgrade events utilizing predefined rollout policies.

The techniques described herein provide systems for optimizing the use of computing resources and to improve the operation of upgrade event deployment to different resources that provide a service by the introduction of predefined rollout policies. The resources can include physical and/or virtual resources (e.g., processing, storage, and/or networking resources) that are divided into different resources units. An upgrade event may include updated code and/or other mechanisms configured to maintain, correct, add, and/or remove functionality associated with the service provided. In one example, the service can include cloud-based applications that provide access to internal sites, documents, lists, libraries and the like from diverse user devices around the world.

The disclosed techniques address several technical problems associated with upgrade event deployment methods. For example, the disclosed system addresses inefficiencies and problems associated with existing upgrade event deployment systems which provide features groups with the autonomy to deploy diverse upgrade events. This often results in inconsistent and undefined rollout policies. As described in more detail below, the disclosed techniques can also improve the security and performance of various resource units. By deploying upgrade events using predefined rollout policies, the disclosed techniques can save computing resources, such as processing cycles, memory resources, and networking resources, by ensuring clear and predictable behavior of deployment vehicles.

Traditional approaches to upgrade event deployment rely upon deployment vehicles that do not follow predefined rollout policies. As such, existing solutions are subject to unpredictable behavior that can lead to severe problems should errors occur during deployment. The problems often degrade the user experience and can have a severe impact on critical applications offered by a service.

In contrast, the disclosed techniques provide clearly defined rollout policies that can be applied to a wide range of deployment vehicles. These rollout policies enable consistent and stable phased deployment of upgrade events that completely remove or at least minimize the negative impact of any potential errors. In addition, by providing a variety of rollout policies, feature groups are afforded flexibility in deploying diverse upgrade event types. For example, a minor upgrade that updates configurations in an ancillary feature of a software service can be deployed quickly with minimal wait time for each phase. Conversely, deployment of a major upgrade that affects core functionality of an application or a widely used feature may take longer, but the chance of a negative impact is removed or minimized as a result of the predefined rollout policy. Thus, a feature group utilizing the disclosed system can select a rollout policy that is suited for varying aspects of different types of scenarios.

In another example of a technical effect of the present disclosure, the predefined rollout policies described herein improve the performance of resources receiving upgrade events even if no errors occur during deployment. This is possible due to the well-defined and predictable behavior of deployment vehicles following a predefined rollout policy. By utilizing predefined rollout policies, a particular resource can be notified when an upgrade event is incoming and whether the upgrade event will result in any downtime or other impact on normal operations. Thus, the system can act proactively by scheduling downtime or notifying users of potential disruptions. In this way, the disclosed techniques can prevent unwanted disruptions to services provided by various resources and ensure that resources receiving upgrade events are consistently operating in a reliable and efficient manner.

Various examples, scenarios, and aspects that enable consistent and stable deployment of upgrade events through predefined rollout policies and monitoring of telemetry data are described below with reference to FIGS. 1-10.

FIG. 1 illustrates an example environment 100 in which a system 102 is configured to deploy upgrade events utilizing predefined rollout policies. FIG. 1 illustrates a deployment vehicle as a deployed upgrade event 104. As described herein, the upgrade event is deployed in accordance with one of a plurality of predefined rollout policies.

FIG. 1 further illustrates various resource units 106(1)-106(N) where N is a positive integer number. The resource units 106(1)-106(N) may be different server farms, or some other division of resources, that comprise at least part of a network (e.g., cloud-based) platform. For instance, the resource units 106(1)-106(N) may be configured within the same and/or different datacenters configured at different geographic locations. Accordingly, a resource can include a server, a storage device, a virtual machine, a virtual network, networking equipment, and so forth, that is under control of an entity providing a service 108 and/or operating the system 102 configured to deploy the upgrade event 104 and to monitor the health and performance of the service 108. To this end, each of the resource units 106(1)-106(N) provides at least a part of the service 108 to end-users, customers, tenants, clients, etc.

A feature group 110 can submit, to an upgrade module 112 of the system 102, an upgrade event 114 to be deployed. The feature group 110 can be any entity that is responsible for deploying the upgrade event 114 to the plurality of resource units 106(1)-106(N). In addition to the upgrade module 112, the system 102 can further include a risk analysis module 116. The risk analysis module is configured to calculate a risk factor 118 based on properties of the upgrade event 114. For instance, the risk factor 118 can be calculated based on a payload type and/or a deployment scope of the upgrade event 114. A payload type can define the nature of the upgrade event including but not limited to a general update, a security patch, a maintenance update, and the like. A deployment scope can define the scope of the resource unit to which the upgrade event is to be deployed including but not limited to server farms, individual tenants, networks, and the like. In an illustrative example, a general update intended for deployment to server farms can result in an elevated risk factor as the update may impact a broad userbase or modify basic functionality of a service. Conversely, a maintenance update intended for individual tenants may result in a low risk factor as the update likely has limited impact on basic functionality of a service nor is it likely to impact a broad userbase.

The risk factor 118 can be a numerical score computed based on an analysis of the various upgrade event properties. In various embodiments, the analysis of the upgrade event properties can comprise assigning a numerical score to individual properties and subsequently calculating a total risk factor. In other configurations, the individual property scores can be weighted to emphasize certain upgrade event properties. It should be understood that the risk factor 118 can be calculated using any properties of the upgrade event. For instance, an upgrade event property may include a reputation of a feature group which is established based on an upgrade event deployment history associated with the feature group. More specifically, if the feature group historically rushes to deploy high-risk upgrade events that result in problems due to faulty work (e.g., limited testing, lack of internal review, etc.), then the reputation of the feature group may indicate higher risk.

The system 102 can further include a rollout policy module 120. After calculating a risk factor 118, the rollout policy module 120 can present a set of predefined rollout policies 122 to the feature group 110 based on the risk factor 118. For instance, the set of predefined rollout policies 122 can be organized according to a level risk. In this example, the set of predefined rollout policies 122 includes a low-risk policy 124, a medium-risk policy 126, and a high-risk policy 128. In further examples, the rollout policy module 120 may also be configured to implement an override workflow policy 130, as further described herein. The number of illustrated modules in the system 102 is just an example, and the number can vary higher or lower. That is, functionality described herein in association with the illustrated modules can be performed by a fewer number of modules or a larger number of modules on one device or spread across multiple devices.

Each rollout policy of the set can define various deployment parameters for pushing the upgrade event 114 to the resource units 106(1)-106(N) (as the deployed upgrade event 104). For example, the deployment parameters can include a number of deployment phases, a size of each deployment phase, a wait time associated with each deployment phase, a deployment scope (e.g., the type of resource unit to which the upgrade event is to be deployed), and the like.

In a more specific example, the low-risk (e.g., fast) policy 124 can be designed for server farms and specify five deployment phases: a first deployment phase comprising 1% of the total resource units, a second deployment phase comprising 10% of the total resource units, a third deployment phase comprising 35% of the total resource units, a fourth deployment phase comprising 70% of the total resource units, and a fifth deployment phase comprising 100% of the total resource units. In addition, each deployment phase can have a twenty-four hour wait time for the low-risk policy 124 to allow for the usage of the upgrade event and the collection of telemetry data, before proceeding to the next deployment phase.

In contrast, a medium-risk policy 126, being slightly more cautious in nature, may specify six deployment phases: a first deployment phase comprising 1% of the total resource units, a second deployment phase comprising 10% of the total resource units, a third deployment phase comprising 25% of the total resource units, a fourth deployment phase comprising 35% of the total resource units, a fifth deployment phase comprising 70% of the total resource units, and a sixth deployment phase comprising 100% of the total resource units. The medium-risk policy 126 can define a thirty-six hour wait time per deployment phase so that there is more time to collect and analyze telemetry data compared to the low-risk policy 124.

The high-risk (e.g., slow) rollout policy 128 can specify twelve deployment phases: a first deployment phase comprising 1% of the total resource units, a second deployment phase comprising 5% of the total resource units, a third deployment phase comprising 10% of the total resource units, a fourth deployment phase comprising 20% of the total resource units, a fifth deployment phase comprising 30% of the total resource units, a sixth deployment phase comprising 40% of the total resource units, a seventh deployment phase comprising 50% of the total resource units, an eighth deployment phase comprising 60% of the total resource units, a ninth deployment phase comprising 70% of the total resource units, a tenth deployment phase comprising 80% of the total resource units, an eleventh deployment phase comprising 90% of the total resource units, and a twelfth deployment phase comprising 100% of the total resource units. In addition, the high-risk policy 128 can specify a forty-eight hour wait time for each deployment phase so that there is even more time to collect and analyze telemetry data compared to the low-risk policy 124 and the medium-risk policy 126.

In one example, the presentation of the predefined rollout policies 122 includes a recommended rollout policy, as further discussed below with respect to FIG. 7A. The recommendation can be generated based on a comparison of the risk factor with risk factor threshold(s) 132. A risk factor threshold 132 can be used by the rollout policy module 120 to clearly associate an upgrade event 114 with one of the predefined rollout policies 122, based on the risk factor 118. Stated alternatively, a risk factor threshold 132 can distinguish between two predefined rollout policies (e.g., if the risk factor 118 is less than the risk factor threshold 132 then the low-risk policy 124 is recommended, if the risk factor 118 is greater than the risk factor threshold 132 then the medium-risk policy 126 is recommended).

Upon receiving a rollout policy selection 134, the system 102 can begin deploying the upgrade event 104 to the resource units 106(1)-106(N) according to the selected rollout policy. For instance, the selected rollout policy can specify deploying the upgrade event 104 in several phases along with a defined wait time between phases to allow for the collection of telemetry data 136. As the deployed upgrade event 104 reaches various resource units, the system can collect the telemetry data 136 from the resource units. The telemetry data 136 can define usage of the upgrade event at a particular resource unit as well as any errors that may have occurred. While the examples discussed herein refer to a set of three rollout policies organized by risk, it should be understood in the context of this disclosure that the set of predefined rollout policies may be any number of policies (e.g., two, four, five, six, etc.) and organized according to any such criteria.

In various examples, a predefined rollout policy can consider geographical locations (e.g., business hours and/or local holidays) of resource units when deploying the upgrade event. For example, the upgrade module 112 may avoid deploying the upgrade event to a resource unit located in a time zone where it is in the middle of the night. In such situations usage of the upgrade event may be sparse or nonexistent because the tenants and customers are likely sleeping, and thus, collecting telemetry data from the resource unit would be infeasible. This can result in inaccurate analysis of the telemetry data and cause the system to wrongly proceed with deployment while errors or bugs may still exist.

Figure 2:
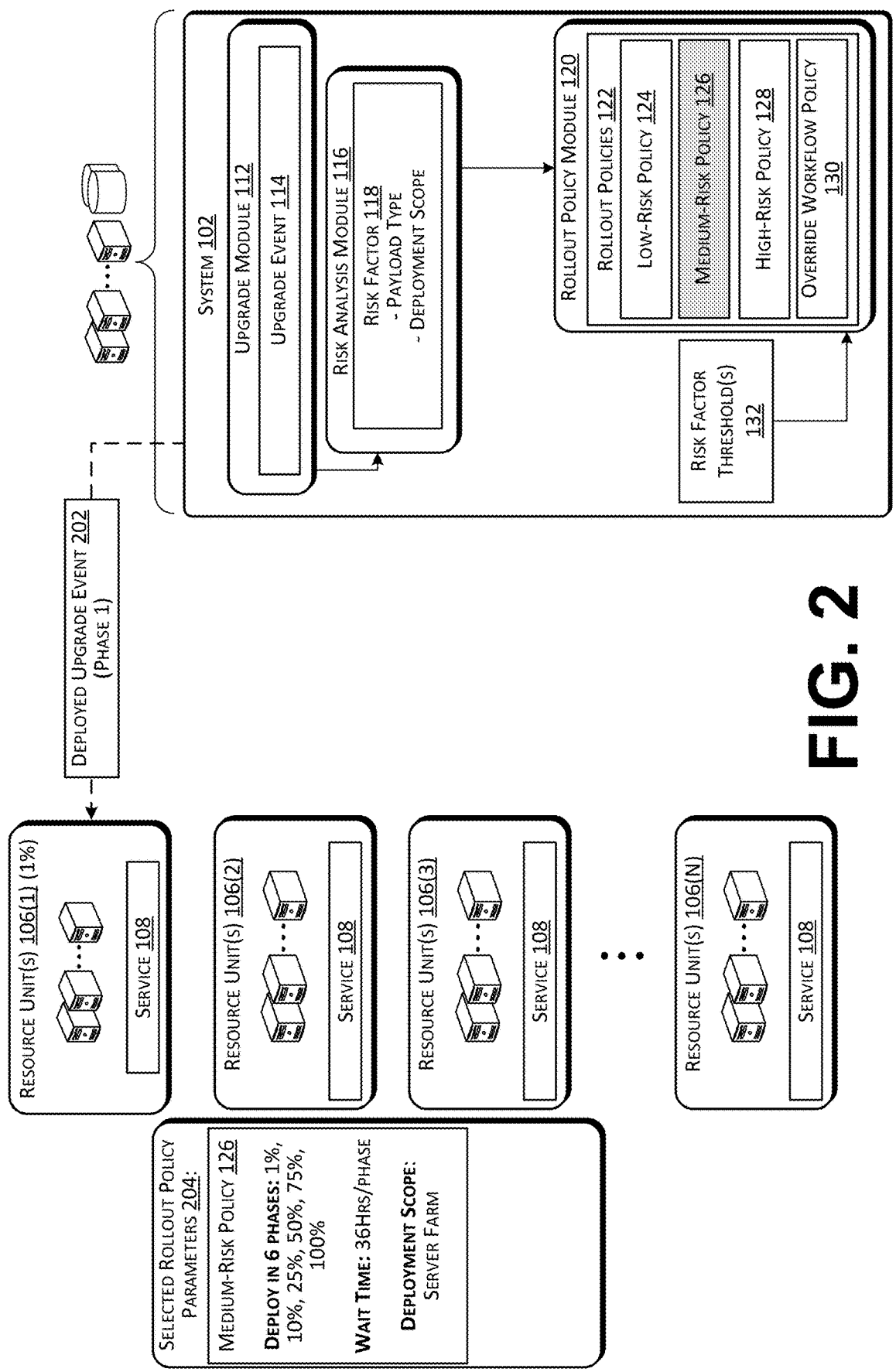
FIG. 2 illustrates aspects of the system in a first state of a process for upgrade deployment using a selected one of the predefined rollout policies.

Turning to FIG. 2, the system 102 in FIG. 1 has begun deploying the upgrade event 202 to a first group of resource units 106(1) as part of a first phase. In this specific example, the feature group 110 (see FIG. 1) has selected the medium-risk policy 126 (e.g., indicated by the shading in FIG. 2). Furthermore, in this example, the parameters 204 of the medium-risk policy 126 specify six deployment phases of 1%, 10%, 25%, 50%, 75%, and 100% of the total resource units, a wait time of thirty-six hours per deployment phase, and a server farm deployment scope meaning an individual resource unit in this case comprises one or more server farms. In this example, the deployed upgrade event 202 has reached resource unit(s) 106(1) representing 1% of the total server farms the upgrade event is intended for, as specified by the rollout policy parameters 204.

In various examples, the resource units can be arranged into deployment phases according to the priority or importance of the resource units. For example, the initial phase(s) can include internal server farms under control of the feature group to enable containment and rapid resolution of any problems that arise. In contrast, the resource units of later phases may belong to high priority entities. High priority entities can include those that handle sensitive information such as a financial institution or those that operate security critical systems such as an airline. By initially deploying to internal or lower priority resource units, the performance and user experience of higher priority resource units can be protected. At this point, the system upgrade module 112 will wait thirty-six hours as specified by the medium-risk rollout policy 126 to allow for collection of telemetry data before proceeding to the next phase. It should be appreciated that the rollout policy parameters discussed above are merely provided as an illustrative example and that predefined rollout policies can define any such parameters that control deployment of upgrade events.

Figure 3:
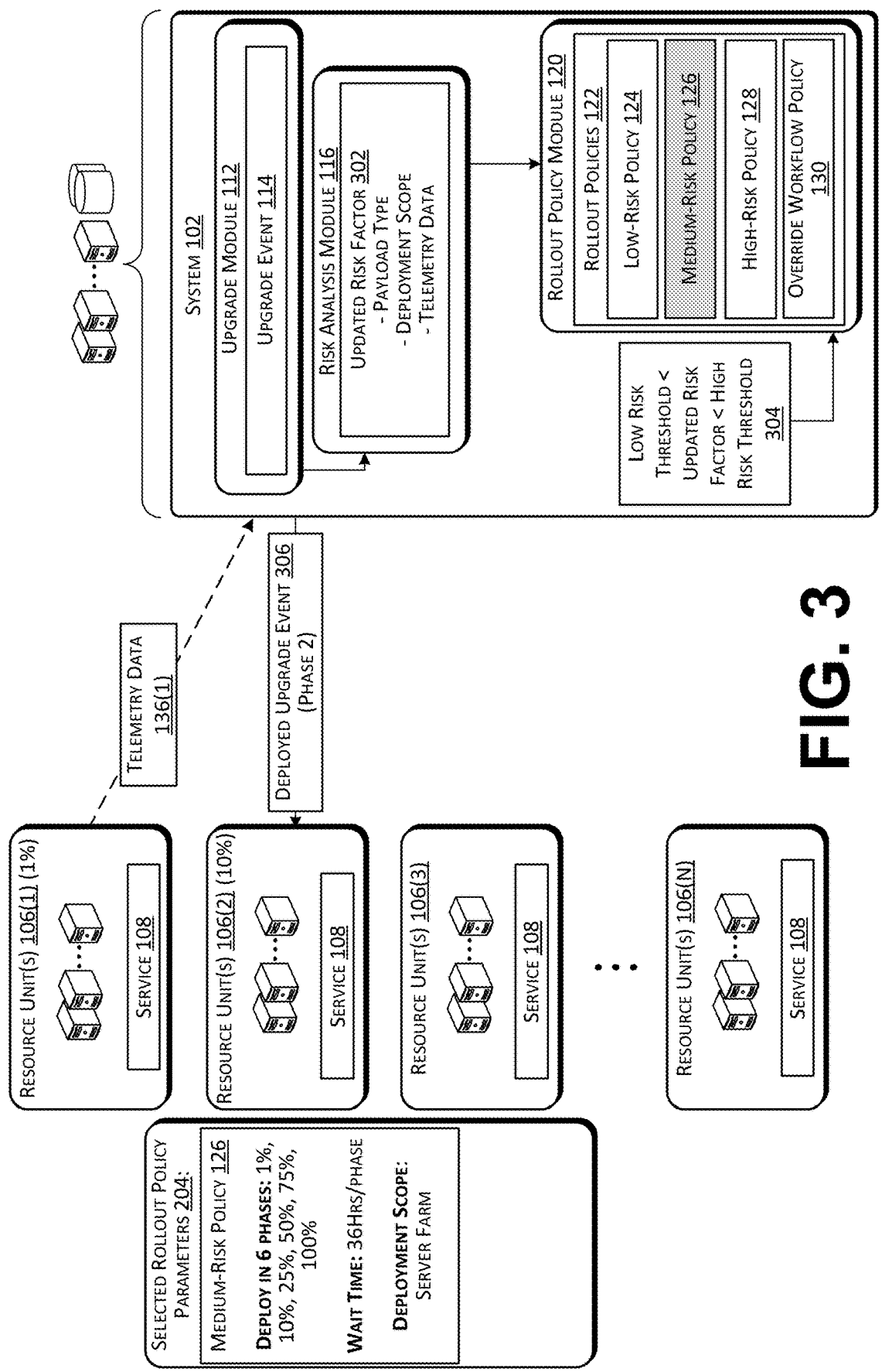
FIG. 3 illustrates aspects of the system in a second state of the process for upgrade deployment using the selected one of the predefined rollout policies.

As shown in FIG. 3, the system in FIG. 1 has collected and/or received telemetry data 136(1) from resource unit(s) 106(1). The telemetry data includes data values for various metrics that are being monitored by the system 102. The metrics being monitored may define usage statistics of the upgrade event at the individual resource units. For instance, the metrics can specify user engagement with a particular feature or errors that may have occurred during use of the deployed upgrade event. The system described herein can monitor and use any one of various metrics defined by the telemetry data. In one example, a metric may include an unexpected number of errors that occur for a predefined time period (e.g., each minute, every five minutes, etc.). An unexpected error may be reported by a user of the service. For instance, a customer may provide feedback indicating that a requested operation was slow to be completed or unable to be completed. Alternatively, an unexpected error may be detected by the system. For instance, an automated detection feature of the service may determine that a particular function provided via the service is unavailable due to a crash that occurs at a particular resource unit. In another example, a metric may include a Quality of Service (QoS) value established in accordance with any one of various QoS models used by the cloud-based platform. The QoS value is a measurement of the performance of the service for users during a predefined time period (e.g., each minute, every five minutes, etc.) based on monitored properties such as packet loss, bit rate, throughput, transmission delay, availability, and so forth.

Turning again to FIG. 3, in this example, the risk analysis module 116 performs an analysis of the metrics defined by the telemetry data 136(1) and has detected no issues during phase 1 of the upgrade event deployment. The risk analysis module 116 is configured to determine an updated risk factor 302 based on the telemetry data 136(1) collected thus far. In this example, the updated risk factor 302 does not exceed or fall below a set of risk factor thresholds 304 established to determine whether deployment of the upgrade event should be switched to a new rollout policy. As such, the system 102 continues deploying the upgrade event according to the medium-risk policy 126. Accordingly, the system proceeds to deploy the upgrade event 306 to resource unit(s) 106(2) or 10% of the total resource units as part of a second phase.

Figure 4:
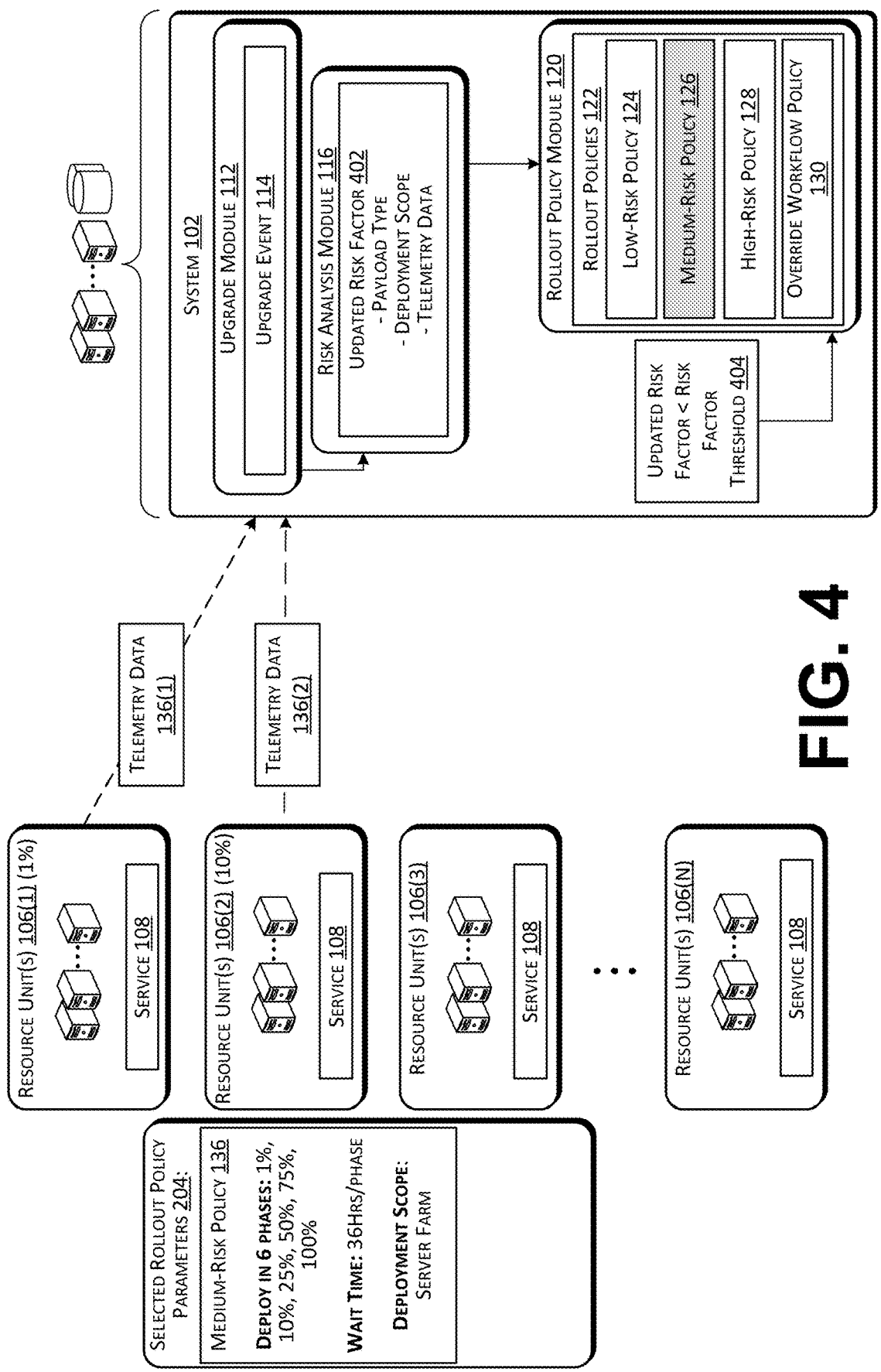
FIG. 4 illustrates aspects of the system in a third state of the process for upgrade deployment using the selected one of the predefined rollout policies.

Referring now to FIG. 4, the system in FIG. 1 has collected and received telemetry data 136(1) and 136(2) from resource units 106(1) and 106(2), respectively. Analysis of the telemetry data 136(1) and 136(2) by the risk analysis module 116 can reveal that no problems were encountered during phase 1 or phase 2 of upgrade event deployment. In response, the risk analysis module 116 can determine a new updated risk factor 402. In this example, since phase 1 and phase 2 of upgrade event deployment were completed successfully, the updated risk factor 402 can be lower than the originally determined risk factor 118. In addition, the updated risk factor 402 can fall below a risk factor threshold 404 established to distinguish between the low-risk policy 124 and the medium-risk policy 126. In response, the rollout policy module 120 may select a new rollout policy for continuing deployment of the upgrade event.

Figure 7A:
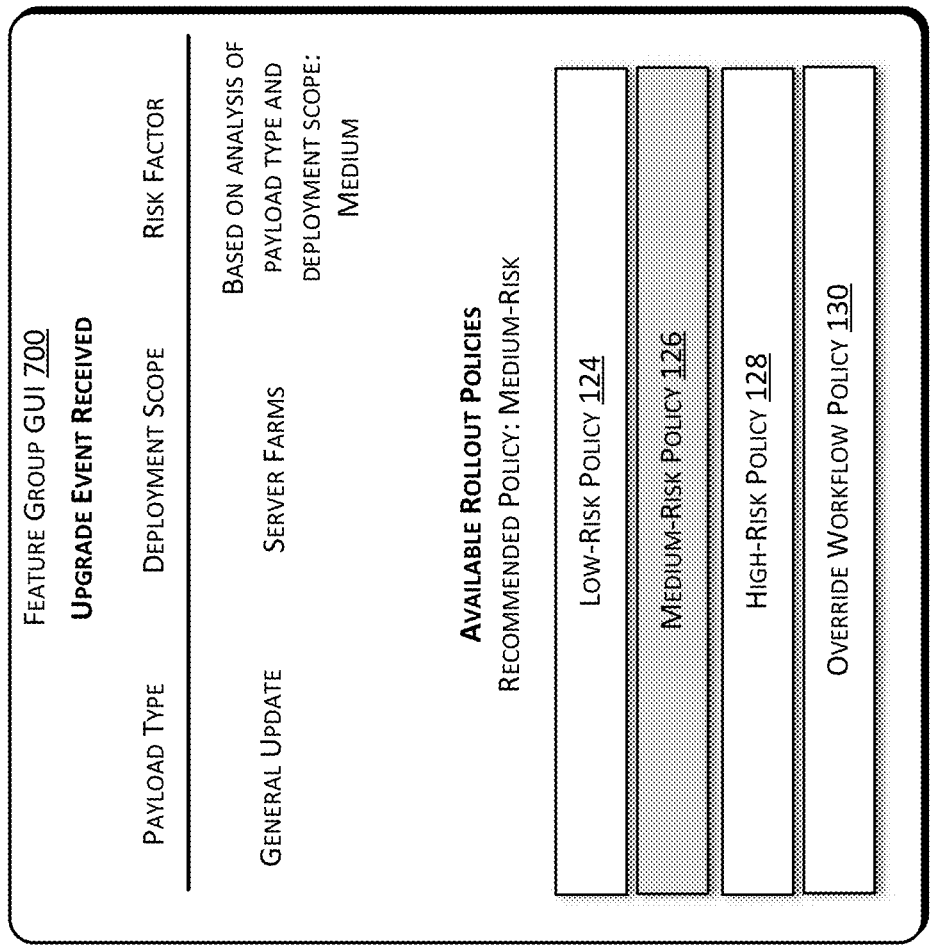
FIG. 7A is an example graphical user interface illustrating how a set of predefined rollout policies can be displayed to a feature group based on an upgrade event and a risk factor.
Figure 7B:
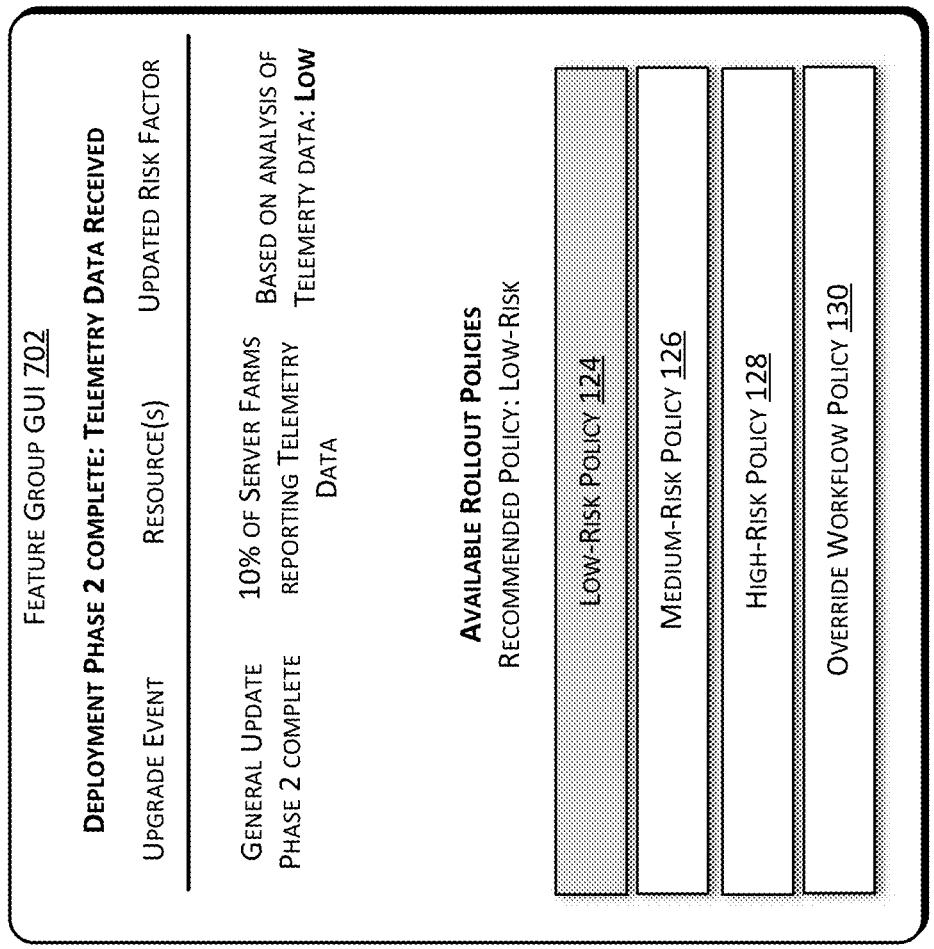
FIG. 7B is an example graphical user interface illustrating how an updated risk factor with an updated rollout policy recommendation can be displayed to the feature group.

In some configurations, the updated risk factor 402 can also be displayed to the feature group 110 along with an updated rollout policy recommendation for selection by the feature group as shown in FIG. 7B. It should be appreciated that the system can be configured to select a new rollout policy automatically or require confirmation by the feature group before replacing the originally selected rollout policy.

Figure 5:
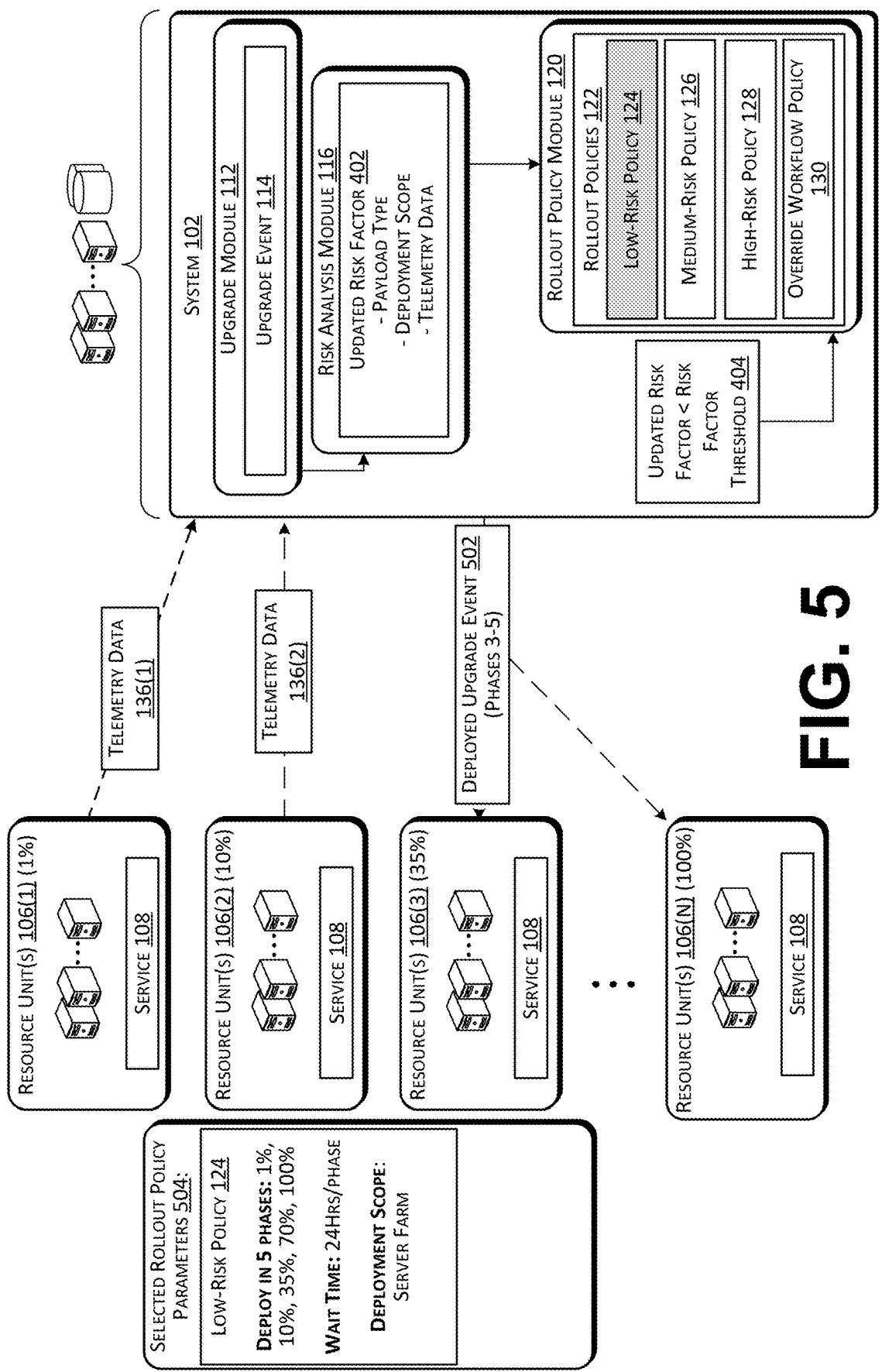
FIG. 5 illustrates aspects of the system in a fourth state of the process for upgrade deployment using a replacement rollout policy.

As shown in FIG. 5, the system 102 has replaced the medium-risk rollout policy 126 with a low-risk policy 124 in response to the updated risk factor 402 falling below a risk factor threshold 404. Thus, the system 102 proceeds to subsequent phases of the rollout. That is, the system 102 proceeds to phases 3-5 of upgrade event deployment 502 utilizing the low-risk policy 124. In this example, the system completes the remaining phases of the upgrade event deployment according to the parameters 504 of the low-risk policy. It should be appreciated that this example is provided to briefly illustrate aspects of the disclosed techniques. Furthermore, it should be appreciated that the system can continue to calculate updated risk factors in subsequent deployment phases and further select rollout policies to continue upgrade deployment accordingly. For instance, the system may proceed to phase 3 of the low-risk rollout policy and upon analysis of new telemetry data determine that the risk factor has increased in response to an elevated error rate and thus exceeds a risk factor threshold. Consequently, the system may revert the upgrade event deployment back to the medium-risk rollout policy. Continuing with its example, the telemetry data may indicate more severe errors and thus updated risk factor may exceed additional risk factor thresholds. In response, the system can select the high-risk rollout policy to slow down the upgrade event deployment and allow more time for the feature group to address issues.

Figure 6:
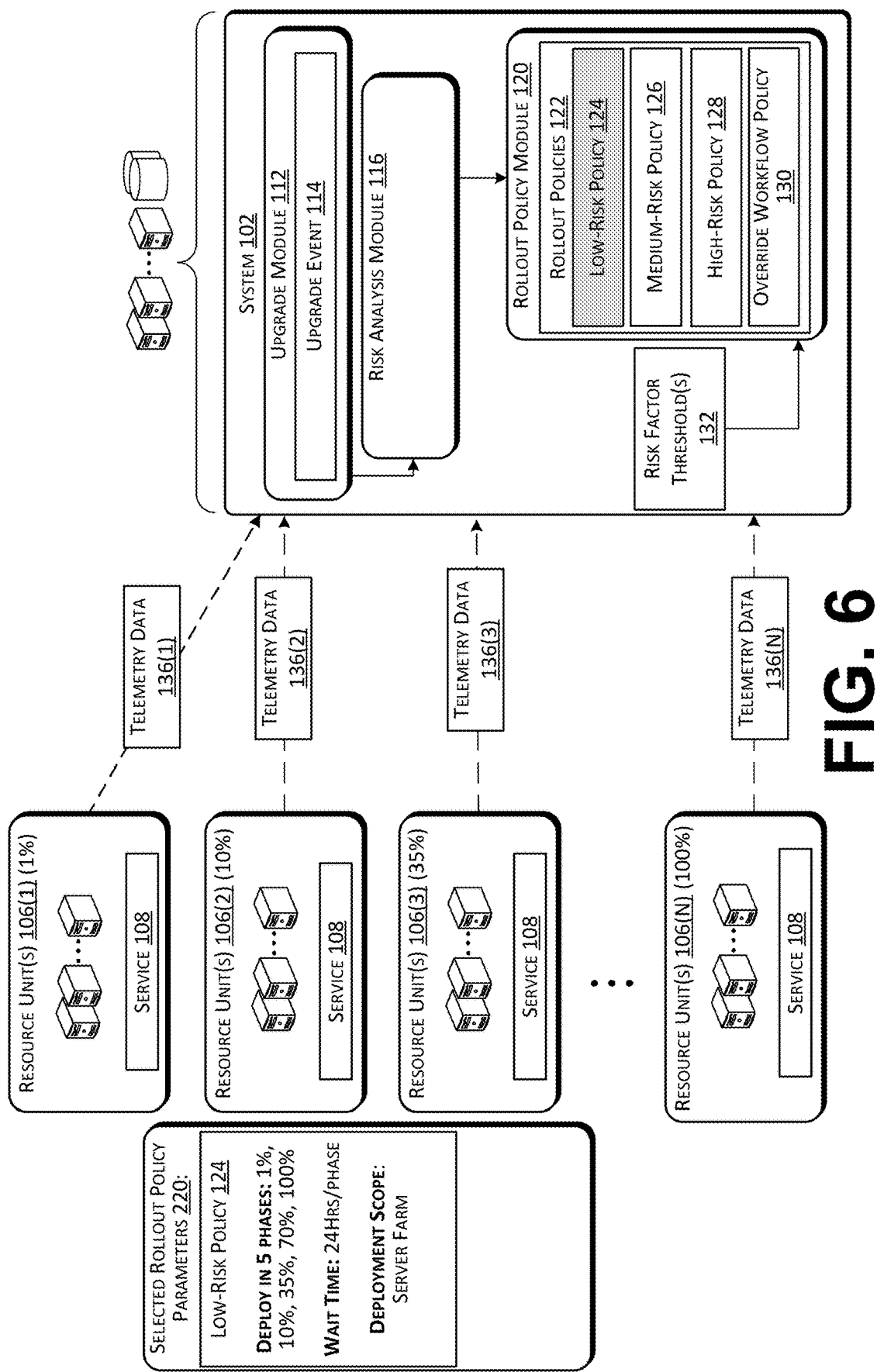
FIG. 6 illustrates aspects of the system in a fifth state of the process for upgrade deployment using the replacement rollout policy.

Referring now to FIG. 6, after the deployed upgrade event 104 has reached all of the intended resource units 106(1)-106(N), the system can subsequently collect or receive telemetry data 136(1)-136(N) from the resource units. Since deployment of the upgrade event followed the parameters 204 and 504 of one or more of the predefined rollout policies, the feature group 110 can agilely address any software bugs or malfunctions (e.g., errors) during deployment. Thus, the metrics defined by the telemetry data collected or received following complete deployment will nominally indicate no errors at the resource units. However, the telemetry data can be further analyzed by the risk analysis module 116 to adjust or refine the predefined rollout policies. Adjustments to the rollout policies may comprise changes to the number of phases, the size of individual phases, the wait time, or any such properties defined by a rollout policy. The analysis of the telemetry data and adjustment of the rollout policies can be accomplished through various machine learning techniques such as regression, classification, neural networks, reinforcement learning and the like.

Turning now to FIG. 7A, an example graphical user interface (GUI) 700 illustrates how a set of predefined rollout policies can be displayed to a feature group for selection. As shown, the GUI 700 can show details of an upgrade event such as payload type (e.g., "General Update"), deployment scope (e.g., "Server Farms"), and a risk factor determined based on the upgrade event properties (e.g., "Medium"). In this example, the GUI 700 also displays a recommended rollout policy based on the risk factor as shown by the highlighted medium-risk rollout policy 126. Finally, the GUI 700 can provide selectable elements 124-130 representing the available rollout policies.

From this GUI 700, the feature group can also select the override workflow policy 130 for use in situations in which upgrade event deployment must be expedited. It should be understood that the system can receive the selection of the rollout policy by way of any suitable user input including but not limited to a touch-sensitive display, a pointing device such as a mouse or stylus and the like.

FIG. 7B is an example GUI 702 illustrating how an updated risk factor can be displayed to a feature group 110. As shown, the GUI 702 can show the current progress of an upgrade event deployment along with an indication that telemetry data has been collected or received from a subset of the total resource units. In addition, the GUI 702 can display an updated risk factor based on an analysis of the telemetry data. In response to the updated risk factor the system can change the rollout policy recommendation accordingly. In this example, the risk factor has been reduced to low and thus the system recommends the low-risk rollout policy 124. Furthermore, in this example, the override workflow policy 130 can also be selected by the feature group while in the midst of an upgrade deployment event.

Figure 8A:
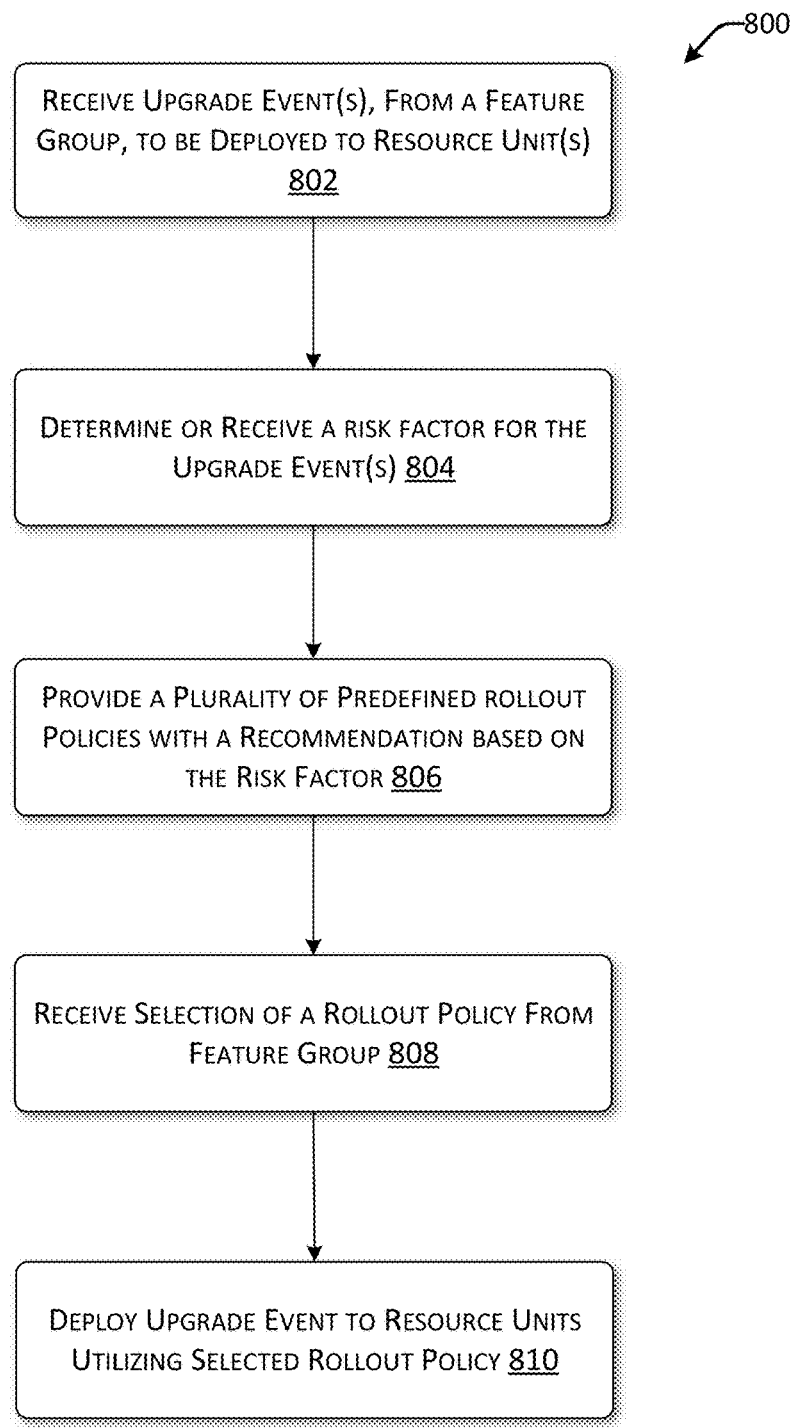
FIG. 8A is a flow diagram of an example method for deploying an upgrade event according to a predefined rollout policy.
Figure 8B:
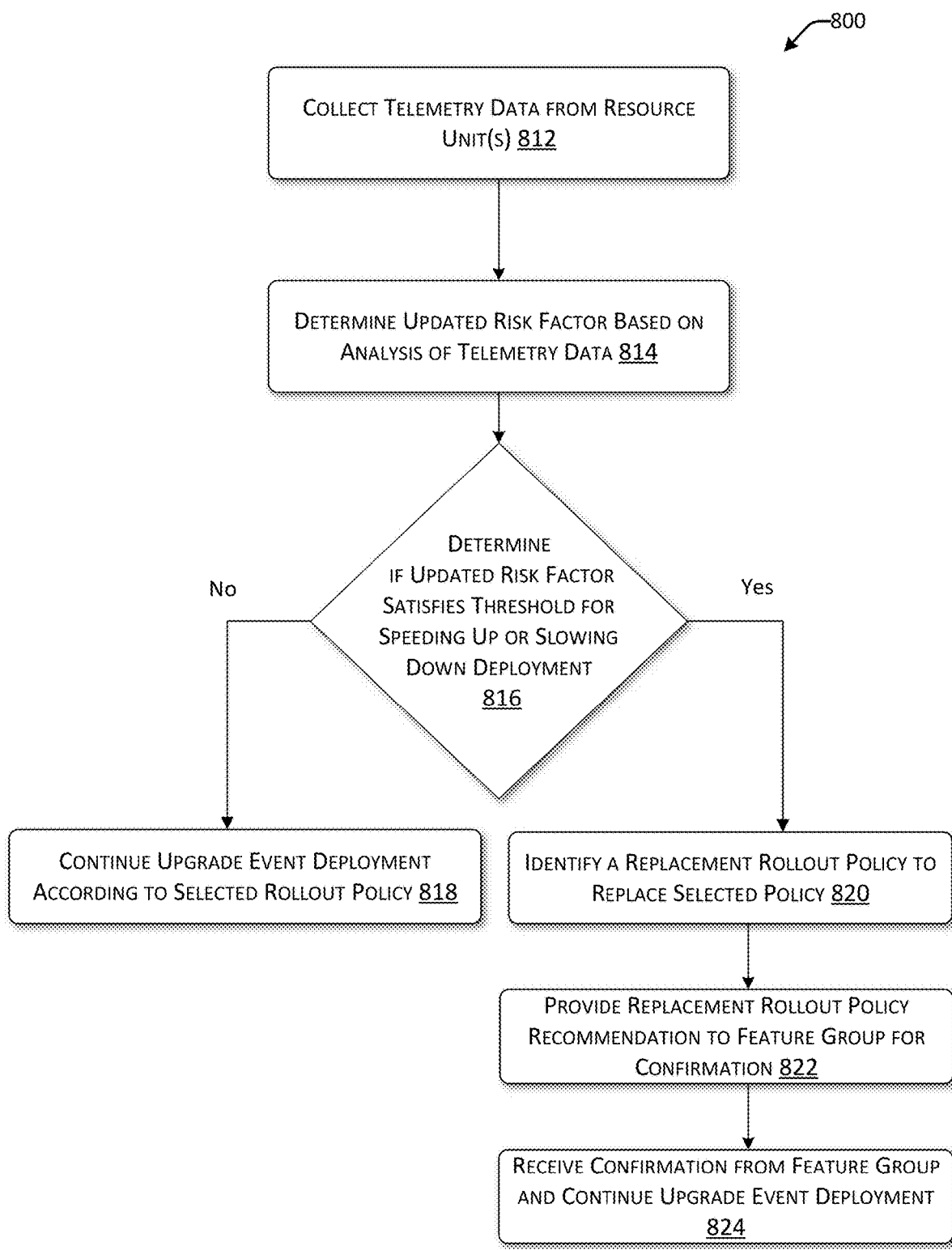
FIG. 8B is a flow diagram of an example method for selecting a replacement rollout policy after upgrade event deployment has commenced.

Referring now to FIGS. 8A and 8B, aspects of a routine 800 for deployment of upgrade events utilizing predefined rollout policies are shown and described below. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 800 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 800 may be also implemented in many other ways. For example, the routine 800 may be implemented, at least in part, by a processor of another remote computer or a local circuit. In addition, one or more of the operations of the routine 800 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 8A, the routine begins at operation 802 where a feature group provides the system with an upgrade event for deployment (e.g., the system receives the upgrade event from the feature group). The upgrade event can specify a payload type, a deployment scope, and/or various other properties. As described above, an upgrade event may include updated code and/or other mechanisms configured to maintain, correct, add, and/or remove functionality associated with the service provided. The service can include cloud-based applications that provide access to internal sites, documents, lists, libraries and the like from diverse user devices. In addition, the service can be constructed of various components, or features.

Proceeding to operation 804, the system determines a risk factor for the upgrade event based on the various properties of the upgrade event. The risk factor can be a numerical score, or other suitable representation of a risk level determined based on an analysis of the various upgrade event properties. Alternatively, the risk factor can be determined by the feature group and provided to the system. In various embodiments, the analysis of the upgrade event properties can comprise assigning a numerical score to individual properties and subsequently calculating a total risk factor. In other configurations, the individual property scores can be weighted to emphasize certain upgrade properties. The techniques disclosed herein can apply to any type of upgrade event property including but not limited to a payload type, a deployment scope, and any other such properties of an upgrade event.

Next, at operation 806, the system presents a set of predefined rollout policies to the feature group for selection. The predefined rollout policies can include a recommendation based on the risk factor. While the examples discussed above refer to a set of three rollout policies organized based on risk it should be understood that the set of predefined rollout policies may be any number of policies and organized according to any such criteria. In various examples, a predefined rollout policy may not be presented as an option due to the risk factor. More specifically, a high risk factor may prevent the fastest deployment rollout policy from being presented as an option.

Next at operation 808, the system receives an input from the feature group selecting a rollout policy from the set of predefined rollout policies. In many examples, the selection is the recommended one. However, in other examples, the feature group can select any of the presented options.

Now at operation 810, the system deploys the upgrade event utilizing the rollout policy selected by the feature group. As the upgrade event reaches the resource unit(s) in a deployment phase, the system can wait the specified wait time for each phase before proceeding with further deployment.

Turning now to FIG. 8B, additional aspects of the system disclosed herein are shown and described. Beginning at operation 812, which continues from operation 810, the system can collect telemetry data from the resource units that have already received the upgrade event. The telemetry data can include data that define various metrics of the upgrade event deployment such as usage statistics, errors that have occurred during deployment during initial use of the upgrade event, and the like.

Proceeding to operation 814, a risk analysis module can determine an updated risk factor based on an analysis of the telemetry data. It should be appreciated that the updated risk factor can be determined based any one of or a combination of the metrics defined by the telemetry data. It should also be understood that similar to the risk factor, the updated risk factor may comprise a numeric value or other suitable representation of a risk level and can be comparatively greater than, less than, or equal to the risk factor.

Next at decision operation 816, the system can determine if the updated risk factor satisfies (e.g., crosses) a risk factor threshold established to differentiate between individual rollout policies. If the updated risk factor does not cross a threshold, the system can proceed to operation 818 and continue to deploy the upgrade event according to the rollout policy originally selected by the feature group.

If the updated risk factor satisfies or crosses the threshold, the system can proceed to operation 820 and identify a replacement rollout policy to replace the selected rollout policy. The replacement rollout policy can be another rollout policy of the set presented to the feature group. In various examples, the replacement rollout policy may dictate a slower upgrade deployment speed. Conversely, the replacement rollout policy may dictate a faster upgrade deployment speed.

Next at operation 822, the system can present a replacement policy recommendation to the feature group for confirmation. The replacement policy recommendation can be presented to the feature group in any suitable fashion. In some examples, the recommendation can be presented in a GUI such as the example illustrated in FIG. 7B. In other embodiments, the recommendation may be transmitted to the feature group through any suitable communication method including but not limited to e-mail, a notification through an application, or the like.

Proceeding to operation 824, the system can receive confirmation from the feature group to use the recommended replacement rollout policy. Upon receiving confirmation, the system can then deploy the upgrade event according to the replacement rollout policy.

Figure 9:
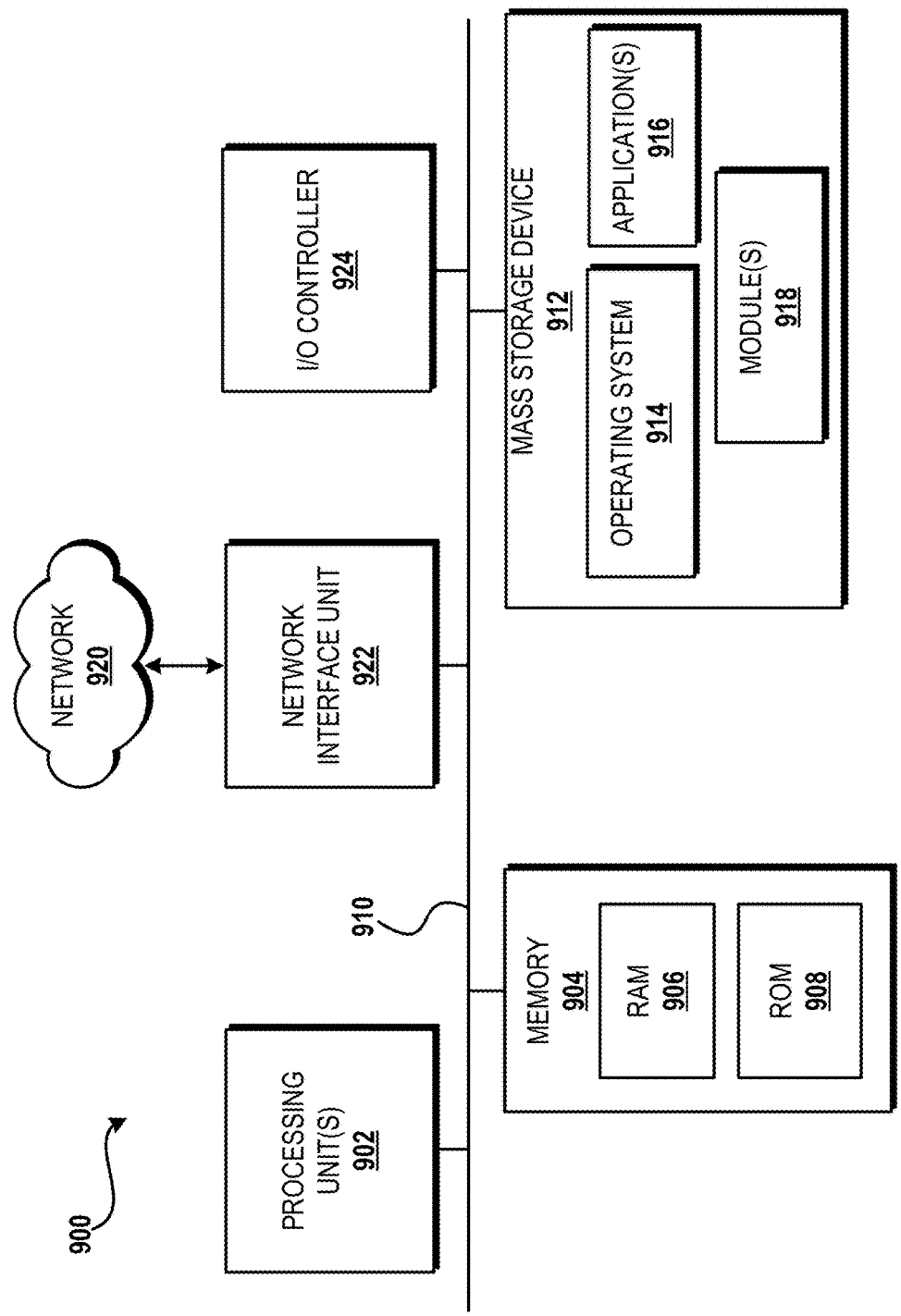
FIG. 9 is a computer architecture diagram illustrating an illustrative computer hardware and software architecture for a computing system capable of implementing aspects of the techniques and technologies presented herein.

FIG. 9 shows additional details of an example computer architecture 900 for a device, such as a computer or a server configured as part of the system 102, capable of executing computer instructions (e.g., a module or a program component described herein). The computer architecture 900 illustrated in FIG. 9 includes processing unit(s) 902, a system memory 904, including a random-access memory 906 ("RAM") and a read-only memory ("ROM") 908, and a system bus 910 that couples the memory 904 to the processing unit(s) 902.

Processing unit(s), such as processing unit(s) 902, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 900, such as during startup, is stored in the ROM 908. The computer architecture 900 further includes a mass storage device 912 for storing an operating system 914, application(s) 916, modules 918 (e.g., upgrade module 112, risk analysis module 116, and the rollout policy module 120), and other data described herein.

The mass storage device 912 is connected to processing unit(s) 902 through a mass storage controller connected to the bus 910. The mass storage device 912 and its associated computer-readable media provide non-volatile storage for the computer architecture 900. Although the description of computer-readable media contained herein refers to a mass storage device, it should be appreciated by those skilled in the art that computer-readable media can be any available computer-readable storage media or communication media that can be accessed by the computer architecture 900.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 900 may operate in a networked environment using logical connections to remote computers through the network 920. The computer architecture 900 may connect to the network 920 through a network interface unit 922 connected to the bus 910. The computer architecture 900 also may include an input/output controller 924 for receiving and processing input from a number of other devices, including a keyboard, mouse, touch, or electronic stylus or pen. Similarly, the input/output controller 924 may provide output to a display screen, a printer, or other type of output device.

It should be appreciated that the software components described herein may, when loaded into the processing unit(s) 902 and executed, transform the processing unit(s) 902 and the overall computer architecture 900 from a general-purpose computing system into a special-purpose computing system customized to facilitate the functionality presented herein. The processing unit(s) 902 may be constructed from any number of transistors or other discrete circuit elements, which may individually or collectively assume any number of states. More specifically, the processing unit(s) 902 may operate as a finite-state machine, in response to executable instructions contained within the software modules disclosed herein. These computer-executable instructions may transform the processing unit(s) 902 by specifying how the processing unit(s) 902 transition between states, thereby transforming the transistors or other discrete hardware elements constituting the processing unit(s) 902.

Figure 10:
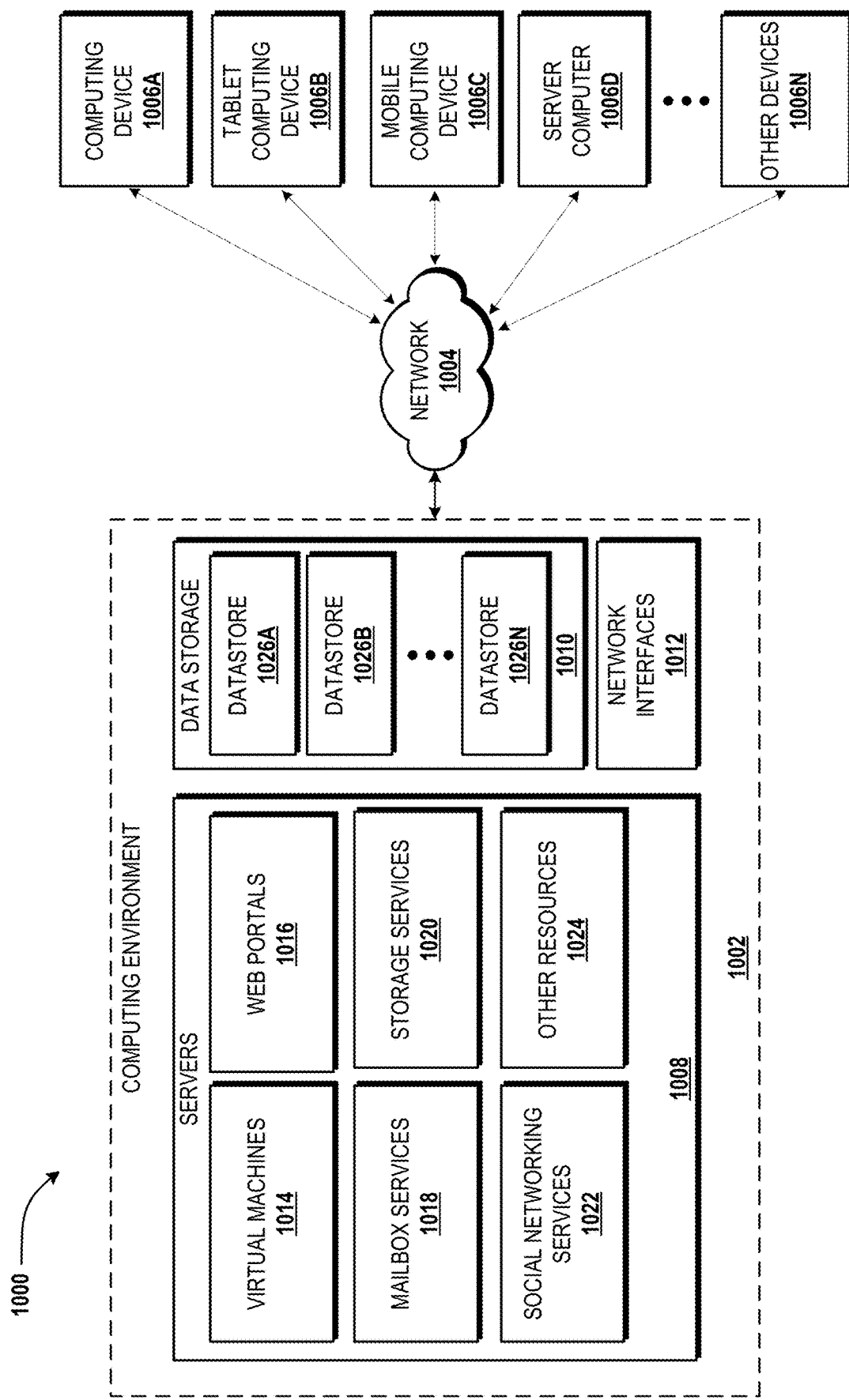
FIG. 10 is a diagram illustrating a distributed computing environment capable of implementing aspects of the techniques and technologies presented herein.

FIG. 10 depicts an illustrative distributed computing environment 1000 capable of executing the software components described herein. Thus, the distributed computing environment 1000 illustrated in FIG. 10 can be utilized to execute any aspects of the software components presented herein. For example, the distributed computing environment 1000 can be utilized to execute aspects of the software components described herein. Accordingly, the distributed computing environment 1000 can include a computing environment 1002 operating on, in communication with, or as part of the network 1004. The network 1004 can include various access networks. One or more client devices 1006A-1006N (hereinafter referred to collectively and/or generically as "clients 1006" and also referred to herein as computing devices 1006) can communicate with the computing environment 1002 via the network 804. In one illustrated configuration, the clients 1006 include a computing device 1006A such as a laptop computer, a desktop computer, or other computing device; a slate or tablet computing device ("tablet computing device") 1006B; a mobile computing device 1006C such as a mobile telephone, a smart phone, or other mobile computing device; a server computer 1006D; and/or other devices 1006N. It should be understood that any number of clients 1006 can communicate with the computing environment 1002.

In various examples, the computing environment 1002 includes servers 1008, data storage 1010, and one or more network interfaces 1012. The servers 1008 can host various services, virtual machines, portals, and/or other resources. In the illustrated configuration, the servers 1008 host virtual machines 1014, Web portals 1016, mailbox services 1018, storage services 1020, and/or, social networking services 1022. As shown in FIG. 10 the servers 1008 also can host other services, applications, portals, and/or other resources ("other resources") 1024.

As mentioned above, the computing environment 1002 can include the data storage 1010. According to various implementations, the functionality of the data storage 1010 is provided by one or more databases operating on, or in communication with, the network 1004. The functionality of the data storage 1010 also can be provided by one or more servers configured to host data for the computing environment 1002. The data storage 1010 can include, host, or provide one or more real or virtual datastores 1026A-1026N (hereinafter referred to collectively and/or generically as "datastores 1026"). The datastores 1026 are configured to host data used or created by the servers 1008 and/or other data. That is, the datastores 1026 also can host or store web page documents, word documents, presentation documents, data structures, algorithms for execution by a recommendation engine, and/or other data utilized by any application program. Aspects of the datastores 1026 may be associated with a service for storing files.

The computing environment 1002 can communicate with, or be accessed by, the network interfaces 1012. The network interfaces 1012 can include various types of network hardware and software for supporting communications between two or more computing devices including, but not limited to, the computing devices and the servers. It should be appreciated that the network interfaces 1012 also may be utilized to connect to other types of networks and/or computer systems.

It should be understood that the distributed computing environment 1000 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1000 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 1000 to utilize the functionality described herein for providing the techniques disclosed herein, among other aspects.

The disclosure presented herein also encompasses the subject matter set forth in the following clauses.

Example Clause A, a system comprising: one or more processing units; and computer-readable storage media having encoded thereon instructions, that when executed by the one or more processing units, cause the system to: receive an upgrade event, from a feature group, to be transmitted to a plurality of resource units; determine a risk factor associated with the upgrade event; provide, based on the risk factor, a plurality of rollout policies, each of the plurality of rollout policies defining at least one parameter for controlling deployment of the upgrade event to the plurality of resource units; receive input from the feature group indicating a selection of a rollout policy from the plurality of rollout policies; deploy the upgrade event to at least some of the plurality of resource units based on the rollout policy selected; collect telemetry data, from the at least some of the plurality of resource units, for the deployed upgrade event; determine, based on the telemetry data collected from the at least some of the plurality of resource units, an updated risk factor associated with the deployed upgrade event; determine that the updated risk factor crosses a risk factor threshold established to differentiate between the rollout policy selected and another rollout policy; and in response to determining that the updated risk factor crosses the risk factor threshold, identify the other rollout policy as a replacement rollout policy for replacing the selected rollout policy.

Example Clause B, the system of Example Clause A, wherein the instructions further cause the system to: present a recommendation for the replacement rollout policy based on the updated risk factor to the feature group; receive input from the feature group confirming selection of the replacement rollout policy; and deploy the upgrade event to additional ones of the plurality of resource units based on the replacement rollout policy.

Example Clause C, the system of Example Clause A or Example Clause B, wherein the deployment of the upgrade event to the additional ones of the plurality of resource units based on the replacement rollout policy is: faster if the updated risk factor decreases compared to the risk factor; or slower if updated risk factor increases compared to risk factor.

Example Clause D, the system of any one of Example Clauses A through C, wherein the risk factor is determined based on a type of payload and a deployment scope.

Example Clause E, the system of any one of Example Clauses A through D, wherein the at least one parameter defines at least one of a number of deployment phases, a size of a deployment phase, a wait time for a deployment phase, or a deployment scope.

Example Clause F, the system of Example Clause E, wherein the deployment scope comprises data defining a type of resource unit to which the upgrade event is to be deployed, the type of resource unit comprising at least one of a server farm, a tenant, or a network.

Example Clause G, the system of Example Clause E, wherein a deployment phase defines a total percentage of the plurality of resource units to which the upgrade event is to be deployed.

Example Clause H, the system of any one of Example Clauses A through G, wherein the instructions further cause the system to recommend a rollout policy based on the risk factor exceeding or falling below the risk factor threshold, wherein the rollout policy selected is the recommended rollout policy.

Example Clause I, the system of Example Clause H, wherein: in an event the risk factor exceeds the risk factor threshold, the updated risk factor threshold falls below the risk factor threshold; or in an event the risk factor falls below the risk factor threshold, the upgraded risk factor exceeds the risk factor threshold.

Example Clause J, a method to be performed by a system for enabling reliable deployment of upgrade events comprising: receiving an upgrade event, from a feature group, to be deployed to a plurality of resource units; determining, by one or more processing units, a risk factor associated with the upgrade event; providing, based on the risk factor, a plurality of rollout policies, each of the plurality of rollout policies defining at least one parameter for controlling deployment of the upgrade event to the plurality of resource units; receiving input from the feature group indicating a selection of a rollout policy from the plurality of rollout policies; and deploying the upgrade event to at least some of the plurality of resource units based on the rollout policy selected.

Example Clause K, the method of Example Clause J, further comprising: collecting telemetry data, from the at least some of the plurality of resource units, for the deployed upgrade event; determining, based on the telemetry data collected from the at least some of the plurality of resource units, an updated risk factor associated with the deployed upgrade event; determining that the updated risk factor crosses a risk factor threshold established to differentiate between the rollout policy selected and another rollout policy; and in response to determining that the updated risk factor crosses the risk factor threshold, identifying the other rollout policy as a replacement rollout policy for replacing the selected rollout policy.

Example Clause L the method of Example Clause J or Example Clause K, wherein the risk factor is determined based on a type of payload and a deployment scope.

Example Clause M, the method of any one of Example Clauses J through L, wherein the at least one parameter defines at least one of a number of deployment phases, a size of a deployment phase, a wait time for a deployment phase, or a deployment scope.

Example Clause N, the method of Example Clause M, wherein the deployment scope comprises data defining a type of resource unit to which the upgrade event is to be deployed, the type of resource unit comprising at least one of a server farm, a tenant, or a network.

Example Clause O, the method of Example Clause M, wherein a deployment phase defines a total percentage of the plurality of resource units to which the upgrade event is to be deployed.

Example Clause P, the method of any one of Example Clauses J through O, further comprising recommending a rollout policy based on the risk factor exceeding or falling below a risk factor threshold.

Example Clause Q, the method of Example Clause J, further comprising: receiving a request for an override workflow policy that includes data defining an increased deployment speed of the upgrade event to the plurality of resource units as compared to speeds of the plurality of rollout policies; and replacing the selected rollout policy with the override workflow policy upon approval of the request.

Example Clause R, a system comprising: one or more processing units; and computer-readable storage media having encoded thereon instructions that when executed by the one or more processing units cause the system to: receive an upgrade event, from a feature group, to be deployed to a plurality of resource units; determine a risk factor associated with the upgrade event; provide, based on the risk factor, a plurality of rollout policies, each of the plurality of rollout policies defining at least one parameter for controlling deployment of the upgrade event to the plurality of resource units; receive input from the feature group indicating a selection of a rollout policy from the plurality of rollout policies; and deploy the upgrade event to at least some of the plurality of resource units based on the rollout policy selected.

Example Clause S, the system of Example Clause R, wherein the risk factor is determined based on a type of payload and a deployment scope.

Example Clause T, the system of Example Clause R or Example Clause S, wherein the at least one parameter defines at least one of a number of deployment phases, a size of a deployment phase, a wait time for a deployment phase, or a deployment scope.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different resource units, two different rollout policies, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and are not to be construed as limiting.

What is claimed is:

1. A system comprising:
    one or more processing units; and
    computer-readable storage media having encoded thereon instructions, that when executed by the one or more processing units cause the system to:
        receive an upgrade event, from a feature group, to be transmitted to a plurality of resource units;
        determine a risk factor associated with the upgrade event;
        provide, based on the risk factor, a plurality of rollout policies, each of the plurality of rollout policies defining one or more parameters for controlling deployment of the upgrade event to the plurality of resource units;

receive input from the feature group indicating a selection of a first rollout policy from the plurality of rollout policies;
deploy the upgrade event to a first subset of the plurality of resource units using the first rollout policy;
collect telemetry data, from the first subset of the plurality of resource units, for the deployed upgrade event;
determine, based on the telemetry data collected from the first subset of the plurality of resource units, an updated risk factor associated with the deployed upgrade event;
determine that the updated risk factor crosses a risk factor threshold established to differentiate between the first rollout policy and a second rollout policy defining at least one changed parameter of the one or more parameters for controlling deployment of the upgrade event;
in response to determining that the updated risk factor crosses the risk factor threshold, identify the second rollout policy as a replacement rollout policy for replacing the first rollout policy; and
continue to deploy the upgrade event to a second subset of the plurality of resource units, that is different from the first subset of the plurality of resource units, using the at least one changed parameter of the second rollout policy.

2. The system of claim 1, wherein the instructions further cause the system to:
present a recommendation for the second rollout policy based on the updated risk factor to the feature group;
receive input from the feature group confirming selection of the second rollout policy; and
deploy the upgrade event to the second subset of the plurality of resource units based on the second rollout policy.

3. The system of claim 2, wherein the deployment of the upgrade event to the second subset of the plurality of resource units based on the second rollout policy is:
faster if the updated risk factor decreases compared to the risk factor; or
slower if updated risk factor increases compared to the risk factor.

4. The system of claim 1, wherein the risk factor is determined based on a type of payload and a deployment scope.

5. The system of claim 1, wherein the one or more parameters defines at least one of a number of deployment phases, a size of a deployment phase, a wait time for a deployment phase, or a deployment scope.

6. The system of claim 5, wherein the deployment scope comprises data defining a type of resource unit to which the upgrade event is to be deployed, the type of resource unit comprising at least one of a server farm, a tenant, or a network.

7. The system of claim 5, wherein a deployment phase defines a total percentage of the plurality of resource units to which the upgrade event is to be deployed.

8. The system of claim 1, wherein the instructions further cause the system to recommend a rollout policy based on the risk factor exceeding or falling below the risk factor threshold, wherein the first rollout policy selected is the recommended rollout policy.

9. The system of claim 8, wherein:
in an event the risk factor exceeds the risk factor threshold, the updated risk factor threshold falls below the risk factor threshold; or
in an event the risk factor falls below the risk factor threshold, the upgraded risk factor exceeds the risk factor threshold.

10. A method to be performed by a system for enabling reliable deployment of upgrade events comprising:
receiving an upgrade event, from a feature group, to be deployed to a plurality of resource units;
determining, by one or more processing units, a risk factor associated with the upgrade event;
providing, based on the risk factor, a plurality of rollout policies, each of the plurality of rollout policies defining one or more parameters for controlling deployment of the upgrade event to the plurality of resource units;
receiving input from the feature group indicating a selection of a first rollout policy from the plurality of rollout policies;
deploying the upgrade event to a first subset of the plurality of resource units based on the first rollout policy;
collecting telemetry data from the first subset of the plurality of resource units, for the deployed upgrade event;
determining, based on the telemetry data collected from the first subset of the plurality of resource units, an updated risk factor associated with the deployed upgrade event;
determining that the updated risk factor crosses a risk factor threshold established to differentiate between the first rollout policy and a second rollout policy defining at least one changed parameter of the one or more parameters for controlling deployment of the upgrade event;
in response to determining that the updated risk factor crosses the risk factor threshold, identifying the second rollout policy as a replacement rollout policy for replacing the first rollout policy; and
continue deploying the upgrade event to a second subset of the plurality of resource units, that is different from the first subset of the plurality of resource units, using the at least one changed parameter of the second rollout policy.

11. The method of claim 10, wherein the risk factor is determined based on a type of payload and a deployment scope.

12. The method of claim 10, wherein the one or more parameters defines at least one of a number of deployment phases, a size of a deployment phase, a wait time for a deployment phase, or a deployment scope.

13. The method of claim 12, wherein the deployment scope comprises data defining a type of resource unit to which the upgrade event is to be deployed, the type of resource unit comprising at least one of a server farm, a tenant, or a network.

14. The method of claim 12, wherein a deployment phase defines a total percentage of the plurality of resource units to which the upgrade event is to be deployed.

15. The method of claim 10, further comprising recommending the first rollout policy based on the risk factor exceeding or falling below the risk factor threshold.

16. The method of claim 10, further comprising:
receiving a request for an override workflow policy that includes data defining an increased deployment speed of the upgrade event to the plurality of resource units as compared to speeds of the plurality of rollout policies; and replacing the first rollout policy with the override workflow policy upon approval of the request.

17. A system comprising:

one or more processing units; and computer-readable storage media having encoded thereon instructions that when executed by the one or more processing units cause the system to:
- receive an upgrade event, from a feature group, to be deployed to a plurality of resource units;
- determine a risk factor associated with the upgrade event;
- provide, based on the risk factor, a plurality of rollout policies, each of the plurality of rollout policies defining one or more parameters for controlling deployment of the upgrade event to the plurality of resource units;
- receive input from the feature group indicating a selection of a first rollout policy from the plurality of rollout policies;
- deploy the upgrade event to a first subset of the plurality of resource units using the first rollout policy;
- collect telemetry data from the first subset of the plurality of resource units, for the deployed upgrade event;
- analyze the telemetry data collected from the first subset of the plurality of resource units to identify a security issue;
- in response to identifying the security issue, receive a request for a second rollout policy defining one or more override workflow parameters comprising an increased deployment speed as compared to a deployment speed of the first rollout policy; and
- in response to receiving the request, continue to deploy the upgrade event to a second subset of the plurality of resource units, that is different from the first subset of the plurality of resource units, using the one or more override workflow parameters of the second rollout policy to address the security issue.

18. The system of claim 17, wherein the risk factor is determined based on a type of payload and a deployment scope.

19. The system of claim 17, wherein the one or more parameters defines at least one of a number of deployment phases, a size of a deployment phase, a wait time for a deployment phase, or a deployment scope.

* * * * *